(No Model.)

J. S. L'HOMMEDIEU.
MUCILAGE BOTTLE.

No. 570,030. Patented Oct. 27, 1896.

WITNESSES:
John Buckler,
C. Giersh

INVENTOR
Joseph S. L'Hommedieu,
BY Edgar Tate & Co
ATTORNEYS.

THE NORRIS PETERS CO., PHOTO-LITHO., WASHINGTON, D. C.

UNITED STATES PATENT OFFICE.

JOSEPH SPINNEY L'HOMMEDIEU, OF GREAT NECK, NEW YORK.

MUCILAGE-BOTTLE.

SPECIFICATION forming part of Letters Patent No. 570,030, dated October 27, 1896.

Application filed March 7, 1896. Serial No. 582,212. (No model.)

*To all whom it may concern:*

Be it known that I, JOSEPH SPINNEY L'HOMMEDIEU, a citizen of the United States, and a resident of Great Neck, in the county of Queens and State of New York, have invented certain new and useful Improvements in Mucilage-Bottles, of which the following is a specification, reference being had to the accompanying drawings, forming a part thereof, in which similar letters of reference indicate corresponding parts.

This invention relates to mucilage bottles or receptacles; and the object thereof is to provide an improved device of this class which comprises a revoluble mucilage-receptacle, at one side of which is formed a curved neck or tube, which communicates therewith and which is adapted, in one position thereof, to project downwardly into the water chamber or receptacle and in another position to project upwardly from the opposite side; and the invention is fully disclosed in the following specification, of which the accompanying drawings form a part, in which—

Figure 1:
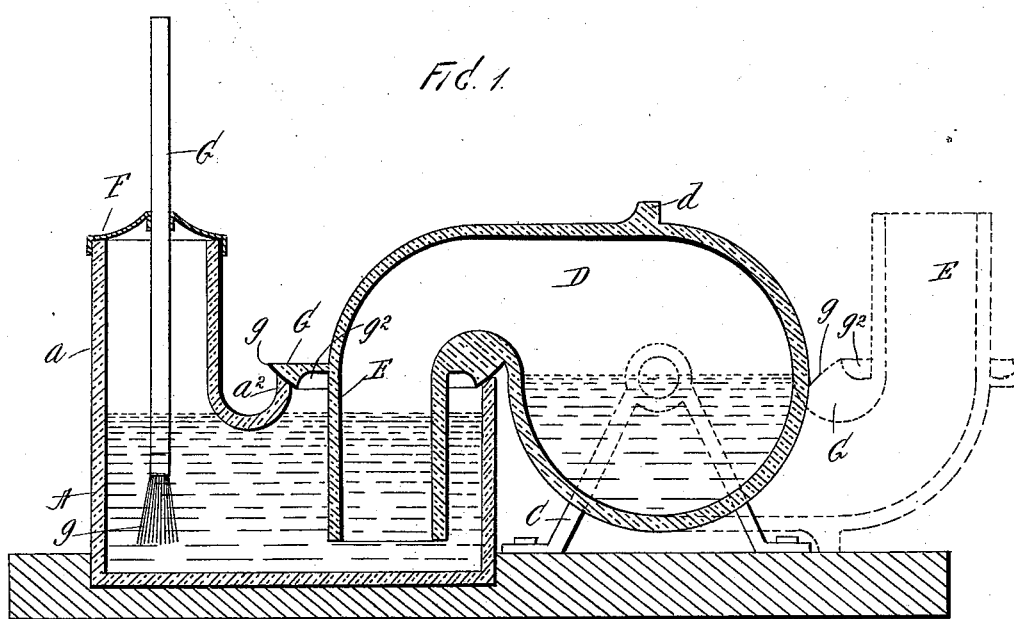
Figure 2:
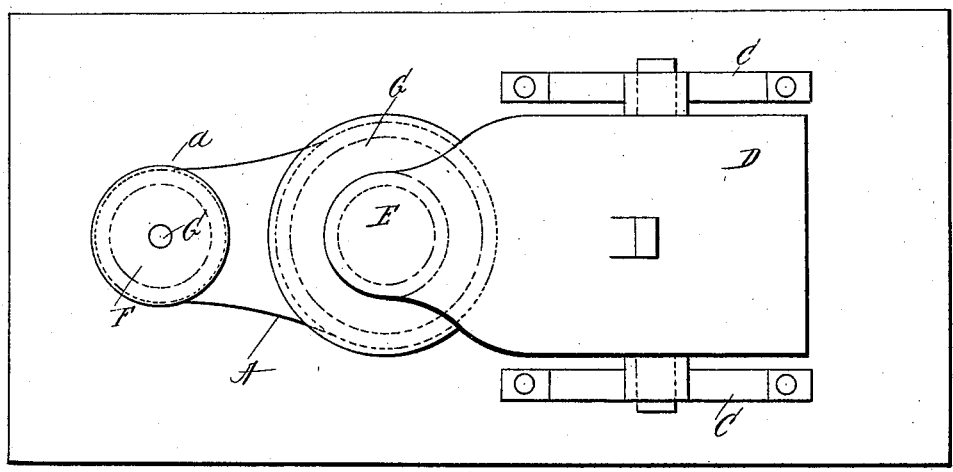

Figure 1 is a transverse vertical section of my improved mucilage bottle or receptacle and also of a water chamber or receptacle employed in connection therewith, and Fig. 2 a plan view thereof.

In the practice of my invention I provide a water vessel A, which is secured to a plate, board, or other support B and which comprises a body portion, at one side of which is an upwardly-directed neck $a$, and the body portion is also provided with a neck $a^2$, and the upper end of each of the necks $a$ and $a^2$ is open.

Mounted at the side of the body portion of the vessel A, on side standards C, is a revoluble bottle or receptacle D, the body portion of which is circular in form, and one side thereof is provided with a curved tube or neck E, around the base of which is formed an annular flange G, the perimeter of which is provided with an inwardly-beveled surface $g$ and the lower side of which is provided with an annular cup-shaped receptacle $g^2$, which in the position of the parts shown in full lines in Fig. 1 is directed downwardly, but which in the position of the parts shown in dotted lines in said figure is directed upwardly.

I also provide a removable cap or cover F for the neck $a$ of the water-receptacle A, through which is passed the handle G of the brush, and said cap or cover F is adjustable on said handle.

In practice the bottle or receptacle D is turned into the position shown in dotted lines in Fig. 1, and the requisite amount of mucilage is placed therein. The vessel A is also filled to about the point shown in Fig. 1 with water, and whenever it is not desired to use the mucilage the bottle or receptacle D is turned into the position shown in Fig. 1, in which position the neck E projects downwardly into the water in the vessel A, and whenever it is desired to use the mucilage the bottle or receptacle D is turned into the opposite position, in which the neck E projects upwardly, as shown in dotted lines in Fig. 1.

Normally the mucilage-brush is always held in the water in the receptacle A, and whenever it is desired to use the same it is removed therefrom, the cap or cover F being removable therewith, and said brush may, as will be understood, be inserted into the neck E when the latter is in the position shown in dotted lines in Fig. 1, and also into the mucilage, which will then rest in the bottom of the bottle or receptacle A.

By means of this construction the brush may always be kept moist and ready for use, and the mucilage cannot evaporate and dry up, and it will also be apparent that but little water can evaporate, and that the water in the vessel A will evaporate very slowly, if at all, by reason of the fact that when the mucilage bottle or receptacle is in the position shown in full lines in Fig. 1 the neck $a^2$ is closed by the annular flange or rim G, and the neck $a$ is normally closed by the removable cap or cover F.

It will also be apparent that the neck E of the bottle or receptacle D cannot become clogged by dried mucilage, as usual in this class of devices, and the annular receptacle $g^2$ is designed to receive any water-drip when the bottle or receptacle is turned into the position shown in dotted lines in Fig. 1.

It will be observed that the bottom of the bottle or receptacle D is provided with a shoulder or projection $d$, which is designed to support the same in a horizontal position when turned on its pivots into the position shown in dotted lines in Fig. 1, and this device is simple in construction and operation and perfectly adapted to accomplish the result for which it is intended, and it is evident that changes in and modifications of the construction herein described may be made without departing from the spirit of my invention or sacrificing its advantages.

Having fully described my invention, I claim as new and desire to secure by Letters Patent—

1. The combination with a base or support, of a water vessel or receptacle, provided with a circular opening in the top thereof, and an extension at one side having a neck formed thereon, and a pivotally-supported mucilage bottle or receptacle adjacent thereto, said mucilage bottle or receptacle being provided with a curved neck or tube, which is adapted to enter the circular opening in the top of the water vessel or receptacle, substantially as shown and described.

2. The combination with a base or support, of a water vessel or receptacle, provided with a circular opening in the top thereof, and an extension at one side having a neck formed thereon, and a pivotally-supported mucilage bottle or receptacle adjacent thereto, said mucilage bottle or receptacle being provided with a curved neck or tube, which is adapted to enter the circular opening in the top of the water vessel or receptacle, and the curved neck or tube of the mucilage bottle or receptacle being provided at its base with an annular rim or flange which is adapted to close the opening in the top of the water vessel or receptacle, substantially as shown and described.

3. The combination with a base or support of a water vessel or receptacle, provided with a circular opening in the top thereof, and an extension at one side having a neck formed thereon, and a pivotally-supported mucilage bottle or receptacle adjacent thereto, said mucilage bottle or receptacle being provided with a curved neck or tube, which is adapted to enter the circular opening in the top of the water vessel or receptacle, and the curved neck or tube of the mucilage bottle or receptacle being provided at its base with an annular rim or flange which is adapted to close the opening in the top of the water vessel or receptacle, said annular flange or rim being provided with an annular cup-shaped receptacle in one side thereof, and the neck of the water vessel or receptacle being provided with a removable cap through which is passed the handle of a mucilage-brush, substantially as shown and described.

In testimony that I claim the foregoing as my invention I have signed my name, in presence of the subscribing witnesses, this 3d day of March, 1896.

JOSEPH SPINNEY L'HOMMEDIEU.

Witnesses:
JOSEPH FRANCIS HAMILTON,
JOHN EDWARD HAMILTON.